United States Patent
Tan et al.

(10) Patent No.: US 10,982,618 B1
(45) Date of Patent: Apr. 20, 2021

(54) METHOD AND SYSTEM FOR CONTROLLING AIR-FUEL RATIO FOR GAS ENGINE

(71) Applicant: WEICHAI POWER CO., LTD., Weifang (CN)

(72) Inventors: Xuguang Tan, Weifang (CN); Wang Li, Weifang (CN); Zhiqiang Yin, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/020,589

(22) Filed: Sep. 14, 2020

(30) Foreign Application Priority Data

Dec. 5, 2019 (CN) .......................... 201911231527.4

(51) Int. Cl.
*F02D 41/34* (2006.01)
*F02D 41/24* (2006.01)

(52) U.S. Cl.
CPC ......... *F02D 41/34* (2013.01); *F02D 41/2429* (2013.01); *F02D 2200/0602* (2013.01); *F02D 2200/0614* (2013.01); *F02D 2200/0618* (2013.01); *F02D 2200/101* (2013.01)

(58) Field of Classification Search
CPC . F02D 9/02; F02D 15/00; F02D 41/24; F02D 41/2429; F02D 41/34; Y02T 10/42; F02C 9/02
See application file for complete search history.

(56) References Cited

U.S. PATENT DOCUMENTS

| 2007/0089720 | A1 | 4/2007 | Takahashi | |
|---|---|---|---|---|
| 2016/0032805 | A1* | 2/2016 | Huang | F01N 3/208 60/274 |
| 2016/0186679 | A1* | 6/2016 | Bizub | F02D 41/0072 60/274 |
| 2017/0051662 | A1* | 2/2017 | Hagari | F02D 41/2432 |
| 2018/0030905 | A1* | 2/2018 | Cress | F02M 37/0023 |
| 2019/0316538 | A1* | 10/2019 | Martin | F02B 37/10 |

FOREIGN PATENT DOCUMENTS

| CN | 203532136 U | 4/2014 |
|---|---|---|
| CN | 106285980 A | 1/2017 |
| CN | 109915271 A | 6/2019 |
| CN | 110159444 A | 8/2019 |

* cited by examiner

*Primary Examiner* — Logan M Kraft
*Assistant Examiner* — Johnny H Hoang
(74) *Attorney, Agent, or Firm* — Fenwick & West LLP

(57) ABSTRACT

A method and a system for controlling an air-fuel ratio for a gas engine are provided. Current outlet pressure of the nozzle is calculated based on current pressure in an intake pipe and a current rotational speed, without detecting the outlet pressure of the nozzle by a sensor. A fluid state of the gas can be determined based on a ratio of the current outlet pressure to the current inlet pressure of the nozzle collected by a sensor, such that a flow rate characteristic corresponding to the fluid state can be selected to calculate power-on duration for the nozzle, so as to set the air-fuel ratio based on the power-on duration. The power-on duration can be calculated based on flow rate characteristics of the gas in respective fluid states, thereby achieving an air-fuel ratio with high accuracy.

15 Claims, 4 Drawing Sheets

METHOD AND SYSTEM FOR CONTROLLING AIR-FUEL RATIO FOR GAS ENGINE

CROSS-REFERENCE TO RELATED APPLICATION

The present application claims priority to Chinese Patent Application No. 201911231527.4, titled "METHOD AND SYSTEM FOR CONTROLLING AIR-FUEL RATIO FOR GAS ENGINE", filed on Dec. 5, 2019, with the China National Intellectual Property Administration, which is incorporated herein by reference in its entirety.

FIELD

The present disclosure relates to the technical field of gas engines, and in particular to a method and a system for controlling an air-fuel ratio for a gas engine.

BACKGROUND

Air-fuel ratio is a mass ratio of air to natural gas in a gas engine. In order to fully burn a gas in the engine, the air-fuel ratio is required to be accurately controlled. By controlling the engine to operate at a better air-fuel ratio, exhaust emission, power performance and economic performance of the engine can be maximized. However, accuracy for controlling the air-fuel ratio is poor according to the conventional technology.

SUMMARY

In view of this, a method and a system for controlling an air-fuel ratio for a gas engine are provided according to the present disclosure. Technical solutions are as follows.

A method for controlling an air-fuel ratio for a gas engine is provided. The method includes: calculating current outlet pressure of a nozzle based on current pressure in an intake pipe and a current rotational speed; determining a fluid state of a gas based on a ratio of the current outlet pressure of the nozzle to current inlet pressure of the nozzle, where the current inlet pressure of the nozzle is collected by a sensor; calculating power-on duration for the nozzle based on a flow rate characteristic corresponding to the fluid state; and controlling the air-fuel ratio based on the power-on duration.

In an embodiment, in the above method, the calculating current outlet pressure includes: calculating the current outlet pressure at the current pressure in the intake pipe and the current rotational speed, based on a preset calibration model of pressure in the intake pipe and outlet pressure of the nozzle.

In an embodiment, in the above method, the calibration model includes a data table recording calibration values. The calculating current outlet pressure includes: determining, in a case that the calibration model includes both a calibration value corresponding to the current pressure in the intake pipe and a calibration value corresponding to the current rotational speed, an outlet pressure calibration value recorded in association with both the calibration value corresponding to the current pressure in the intake pipe and the calibration value corresponding to the current rotational speed as the current outlet pressure of the nozzle; and performing, in a case that the calibration model fails to include both the calibration value corresponding to the current pressure in the intake pipe and the calibration value corresponding to the current rotational speed, a weighted calculation on the current pressure in the intake pipe, the current rotational speed and selected calibration values, to obtain the current outlet pressure of the nozzle.

In an embodiment, in the above method, the current rotational speed is V, the current pressure in the intake pipe is X, and accordingly the current outlet pressure Y is calculated from the following equation:

$$Y = \frac{X - X_1}{X_2 - X_1} * \left[ \frac{V - V_1}{V_2 - V_1} * Y_{11} + \frac{V_2 - V}{V_2 - V_1} * Y_{12} \right] + \frac{X_2 - X}{X_2 - X_1} * \left[ \frac{V - V_1}{V_2 - V_1} * Y_{21} + \frac{V_2 - V}{V_2 - V_1} * Y_{22} \right]$$

where $V_1$ and $V_2$ represent two calibration values of rotational speeds sandwiching V, $X_1$ and $X_2$ represent two calibration values of pressure in the intake pipe sandwiching X, $Y_{ij}$ represents an outlet pressure calibration value corresponding to $V_i$ and $X_j$, i is 1 or 2, and j is 1 or 2.

In an embodiment, in the above method, the determining a fluid state of a gas includes: determining the fluid state of the gas to be a sonic jet state in a case that the ratio is less than a set threshold; and determining the fluid state of the gas to be a subsonic jet state in a case that the ratio is not less than the set threshold.

In an embodiment, in the above method, the calculating power-on duration includes: calculating the power-on duration based on a flow rate characteristic of the gas in the sonic jet state in a case that the gas is in the sonic jet state; and calculating the power-on duration based on a flow rate characteristic of the gas in the subsonic jet state in a case that the gas is in the subsonic jet state.

In an embodiment, the method further includes: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

A system for controlling an air-fuel ratio for a gas engine is further provided according to the present disclosure. The system includes a first calculation module, a fluid state determination module, a second calculation module, and a control module. The first calculation module is configured to calculate current outlet pressure of a nozzle based on current pressure in an intake pipe and a current rotational speed. The fluid state determination module is configured to determine a fluid state of a gas based on a ratio of the current outlet pressure of the nozzle to current inlet pressure of the nozzle, where the current inlet pressure of the nozzle is collected by a sensor. The second calculation module is configured to calculate power-on duration for the nozzle based on a flow rate characteristic corresponding to the fluid state. The control module is configured to control the air-fuel ratio based on the power-on duration.

In an embodiment, in the above system, the first calculation module is configured to calculate the current outlet pressure at the current pressure in the intake pipe and the current rotational speed, based on a preset calibration model of pressure in the intake pipe and outlet pressure of the nozzle.

In an embodiment, in the above system, the calibration model includes a data table recording calibration values. The first calculation module calculates the current outlet pressure of the nozzle by: determining, in a case that the calibration model includes both a calibration value corresponding to the current pressure in the intake pipe and a calibration value corresponding to the current rotational speed, an outlet pressure calibration value recorded in association with both the calibration value corresponding to the current pressure in the intake pipe and the calibration value corresponding to the current rotational speed as the current outlet pressure of the nozzle; and performing, in a case that the calibration model fails to include both the calibration value corresponding to the current pressure in the intake pipe and the calibration value corresponding to the current rotational speed, a weighted calculation on the current pressure in the intake pipe, the current rotational speed and selected calibration values, to obtain the current outlet pressure of the nozzle.

It can be seen from the above description that with the method and the system for controlling an air-fuel ratio for a gas engine according to the technical solutions of the present disclosure, the current outlet pressure of the nozzle can be calculated based on the current pressure in the intake pipe and the current rotational speed, without detecting the outlet pressure of the nozzle by a sensor. The fluid state of the gas can be determined based on the ratio of the current outlet pressure to the current inlet pressure of the nozzle collected by a sensor, such that a flow rate characteristic corresponding to the fluid state can be selected to calculate the power-on duration for the nozzle. Thereby, the air-fuel ratio can be set based on the power-on duration. It can be seen that with the technical solutions of the present disclosure, the power-on duration can be calculated based on the flow rate characteristics of the gas in respective fluid states, thereby achieving an air-fuel ratio with high accuracy.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is Apparent that the drawings in the following description show only embodiments of the present disclosure, and other drawings may be obtained by those skilled in the art from the disclosed drawings without any creative work.

DETAILED DESCRIPTION

Technical solutions in embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

According to the conventional technology, a gas flow rate in an equivalent (air mass required to exactly burn 1 kg of gas)+high-pressure cooling exhaust gas recirculation (EGR) gas engine is controlled by a gas nozzle. The gas flow rate in the nozzle cannot be calculated accurately due to low gas pressure, and nonlinearity between gas flow rates at opening and closing time instants of the nozzle will also cause inaccurate measurement of the gas flow rate, resulting in inaccurate power-on duration for the nozzle. Consequently, the air-fuel ratio cannot be controlled accurately.

To solve the above problems, a method and a system for controlling an air-fuel ratio for a gas engine are provided according to embodiments of the present disclosure. Current outlet pressure of the nozzle can be accurately calculated based on current pressure in an intake pipe and a current rotational speed, so that a fluid state of a gas can be determined based on a ratio of the current outlet pressure of the nozzle to the current inlet pressure of the nozzle. A flow rate characteristic corresponding to the fluid state is selected to calculate power-on duration for the nozzle, thereby achieving an air-fuel ratio with high accuracy.

The present disclosure is further described in detail below with reference to the accompanying drawings and specific embodiments, so that the above objects, features and advantages of the present disclosure are obvious and understandable.

Figure 1:
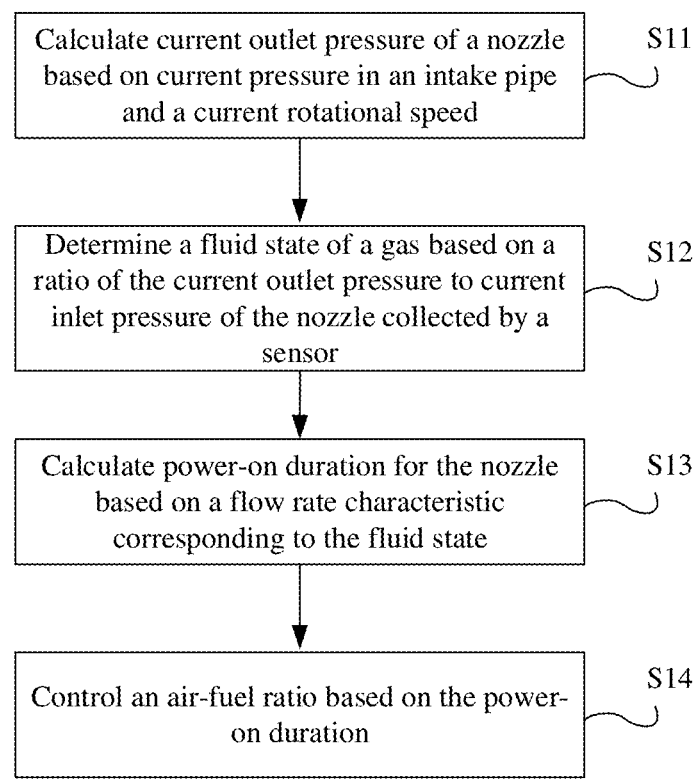
FIG. 1 is a schematic flowchart of a method for controlling an air-fuel ratio of a gas engine according to an embodiment of the disclosure.
Figure 5:
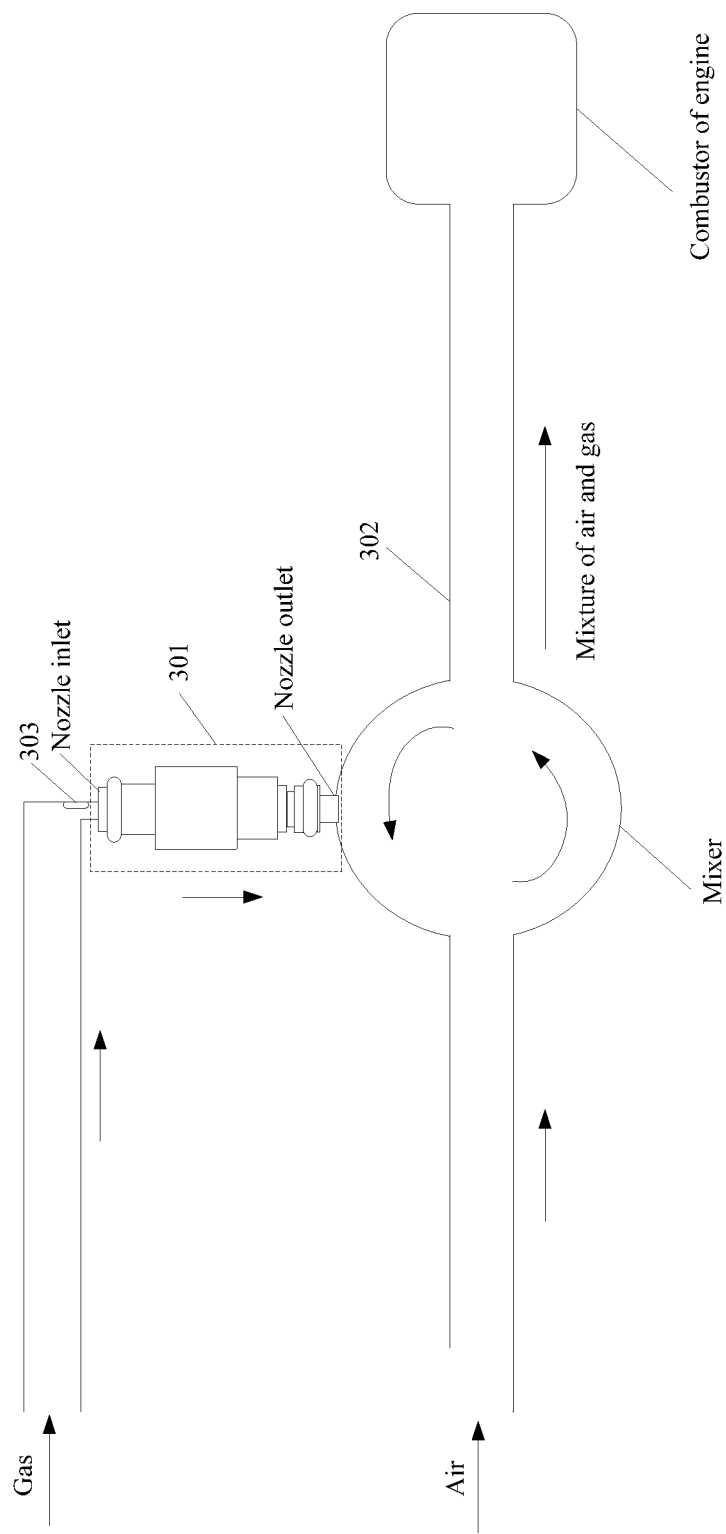
FIG. 5 is a schematic diagram of part of a gas engine according to an embodiment of the present disclosure.

Reference is made to FIG. 1, which is a schematic flowchart of a method for controlling an air-fuel ratio of a gas engine according to an embodiment of the disclosure. The method includes the following steps S11 to S14. In addition, reference is also made to FIG. 5 in the following description of the steps.

In step S11, current outlet pressure of a nozzle 301 is calculated based on current pressure in an intake pipe 302 and a current rotational speed.

It is found from study that for a certain rotational speed of the gas engine and certain pressure in the intake pipe, gas charging efficiency of the gas engine is fixed. In this case, an air flow rate, an EGR flow rate, and the gas flow rate may also be considered fixed. For a certain mixer structure and certain arrangement of a gas pipe, the gas flow rate is fixed, and the outlet pressure of the nozzle is also fixed. That is, for a gas engine at a certain rotational speed, the same pressure in the intake pipe corresponds to same outlet pressure of the nozzle. Therefore, the outlet pressure of the nozzle can be calculated based on the pressure in the intake pipe and the rotational speed.

In step S12, a fluid state of a gas is determined based on a ratio of the current outlet pressure of the nozzle to current inlet pressure of the nozzle. The current inlet pressure of the nozzle is collected by a sensor 303. The gas engine is provided with a sensor 303 to collect the inlet pressure of the nozzle.

It can be seen from the above description that the outlet pressure of the nozzle can be calculated based on the pressure in the intake pipe. Therefore, the ratio is associated with a relationship between the pressure in the intake pipe and gas pressure. A speed state of the gas can be determined based on the relationship between the pressure in the intake pipe and the gas pressure, to determine the fluid state. Subsequently, power-on duration for the nozzle can be calculated based on various flow rate characteristics of the gas, so as to improve accuracy for measuring the gas.

The pressure in the intake pipe represents the air pressure, and the outlet pressure of the nozzle represents the gas pressure. In the method, the speed state of the gas is determined based on the relationship between the pressure in the intake pipe and the gas pressure, to improve the accuracy for measuring the gas based on the flow rate characteristics of various models of the gas, thereby improving accuracy for controlling a transient air-fuel ratio.

In step S13, power-on duration for the nozzle is calculated based on a flow rate characteristic corresponding to the fluid state.

In step S14, the air-fuel ratio is controlled based on the power-on duration.

With the method according to the embodiment of the present disclosure, power-on duration for the nozzle can be calculated accurately, so as to accurately control the gas flow rate, thereby accurately controlling the air-fuel ratio.

column where the calibration value of the pressure in the intake pipe is arranged. The sampling number, a range, and a step length of each of the calibration value of the rotational speed and the calibration value of the pressure in the intake pipe may be set based on requirements, and are not limited in the embodiments of the present disclosure. For each calibration value of the rotational speed and each calibration value of the pressure in the intake pipe, a calibration value of the outlet pressure associated with the calibration value of the rotational speed and the calibration value of the pressure in the intake pipe is not shown in the above table. It is apparent that a calibration value of the outlet pressure associated with a given calibration value of the rotational speed and a given calibration value of the pressure in the intake pipe may be measured in the laboratory, which is not limited in the present disclosure.

TABLE 1

Calibration table for pressure in intake pipe and gas pressure

| | PIP | | | | | | | | | | | | | | | | |
|---|---|---|---|---|---|---|---|---|---|---|---|---|---|---|---|---|---|
| RS | 30 | 40 | 50 | 60 | 70 | 80 | 90 | 100 | 110 | 120 | 130 | 140 | 150 | 160 | 170 | 180 | 190 |
| 700 | | | | | | | | | | | | | | | | | |
| 750 | | | | | | | | | | | | | | | | | |
| 800 | | | | | | | | | | | | | | | | | |
| 850 | | | | | | | | | | | | | | | | | |
| 900 | | | | | | | | | | | | | | | | | |
| 950 | | | | | | | | | | | | | | | | | |
| 1000 | | | | | | | | | | | | | | | | | |
| 1050 | | | | | | | | | | | | | | | | | |
| 1100 | | | | | | | | | | | | | | | | | |
| 1150 | | | | | | | | | | | | | | | | | |
| 1200 | | | | | | | | | | | | | | | | | |
| 1250 | | | | | | | | | | | | | | | | | |
| 1300 | | | | | | | | | | | | | | | | | |
| 1350 | | | | | | | | | | | | | | | | | |

The current outlet pressure is calculated as follows. The current outlet pressure at the current pressure in the intake pipe (abbreviated as PIP in Table 1 and the following Table 2) and the current rotational speed (abbreviated as RS in Table 1 and the following Table 2) is calculated based on a preset calibration model of pressure in the intake pipe and outlet pressure of the nozzle.

As described above, in the method according to the embodiment of the present disclosure, a calibration model may be constructed in advance to calculate the current outlet pressure of the nozzle in view of the fact that a gas engine with a certain pressure in the intake pipe and a certain rotational speed has a certain outlet pressure of the nozzle. The calibration model includes the above data table (Table 1), which shows pressure in the intake pipe and gas pressure. Table 1 includes multiple sets of calibration data. One set of calibration data includes a calibration value of the inlet pressure, a calibration value of the rotational speed, and a calibration value of the outlet pressure. Each calibration value in the calibration table may be obtained through laboratory tests. As shown in Table 1, the calibration value of the rotational speed ranges from 700 rpm to 1350 rpm (with a step length of 50 rpm), the calibration value of the pressure in the intake pipe ranges from 30 KPa to 190 KPa (with a step length of 10 KPa), and a calibration value of the outlet pressure associated with a calibration value of the rotational speed and a calibration value of the pressure in the intake pipe is arranged at an intersection of a row where the calibration value of the rotational speed is arranged and a Based on the calibration model constructed in advance, the current outlet pressure is calculated as follows. In a case that the calibration model includes both a calibration value corresponding to the current pressure in the intake pipe and a calibration value corresponding to the current rotational speed, an outlet pressure calibration value recorded in association with both the calibration value corresponding to the current pressure in the intake pipe and the calibration value corresponding to the current rotational speed is determined as the current outlet pressure. In a case that the calibration model includes neither or only one of the calibration value corresponding to the current pressure in the intake pipe and the calibration value corresponding to the current rotational speed, a weighted calculation is performed on the current pressure in the intake pipe, the current rotational speed and selected calibration values to obtain the current outlet pressure.

For example, the current rotational speed is V, and the current pressure in the intake pipe is X, and accordingly the current outlet pressure Y is calculated from the following equation:

$$Y = \frac{X - X_1}{X_2 - X_1} * \left[ \frac{V - V_1}{V_2 - V_1} * Y_{11} + \frac{V_2 - V}{V_2 - V_1} * Y_{12} \right] +$$
$$\frac{X_2 - X}{X_2 - X_1} * \left[ \frac{V - V_1}{V_2 - V_1} * Y_{21} + \frac{V_2 - V}{V_2 - V_1} * Y_{22} \right]$$

where $V_1$ and $V_2$ represent two calibration values of rotational speeds sandwiching V, $X_1$ and $X_2$ represent two calibration values of pressure in the intake pipe sandwiching X, $Y_{ij}$ represents an outlet pressure calibration value corresponding to $V_i$ and $X_j$, i is 1 or 2, and j is 1 or 2.

$V_1$, $V_2$, $X_1$ and $X_2$ are selected calibration values for the weighted calculation. Four calibration values $Y_{ij}$ of the outlet pressure may be determined in the above table after $V_1$, $V_2$, $X_1$ and $X_2$ are selected. The selected $V_1$, $V_2$, $X_1$, $X_2$ and $Y_{ij}$ form a set of calculation data. The calculation data may be selected in multiple manners, such as: one set of calculation data may be selected to calculate one value of the current outlet pressure; alternatively, multiple sets of different calculation data may be selected to calculate multiple values of the current outlet pressure, and an average of the multiple values of the current outlet pressures may be obtained as a finally determined current outlet pressure, so as to improve calculation accuracy.

Hereinafter, one set of calculation data is selected to calculate the current outlet pressure (abbreviated as OP in Table 2) from the above equation, which is described in order to explain the above process of calculating the current outlet pressure.

TABLE 2

Calibration table for part of data

| RS | PIP 120 | 125 |
|---|---|---|
|  | OP | OP |
| 1100 | 135 | 137 |
| 1150 | 137 | 139 |

The above Table 2 shows part of data in a calibration table based on the embodiment of the present disclosure, and records the following set of calculation data including: a calibration value of 135 KPa of the outlet pressure associated with a calibration value of 1100 rpm of the rotational speed and a calibration value of 120 KPa of the pressure in the intake pipe, a calibration value of 137 KPa of the outlet pressure associated with the calibration value of 1100 rpm of the rotational speed and a calibration value of 125 KPa of the pressure in the intake pipe, a calibration value of 137 KPa of the outlet pressure associated with a calibration value of 1150 rpm of the rotational speed and the calibration value of 120 KPa of the pressure in the intake pipe, and a calibration value of 139 KPa of the outlet pressure associated with a calibration value of 1150 rpm of the rotational speed and the calibration value of 125 KPa of the pressure in the intake pipe. Based on the above equation, the current outlet pressure in this case is calculated as follows.

Current outlet pressure=(123−120)/(125−120)*
[(1110−1100)/(1150−1100)*135+(1150−1110)/
(1150−1100)*137]+(125−123)/(125−120)*
[(1110−1100)/(1150−1100)*137+(1150−1110)/
(1150−1100)*139]=137.4

With the method according to the embodiment of the present disclosure, the current outlet pressure of the nozzle is calculated based on the above calibration model and a specific differential weighted algorithm. A fluid state of the gas is determined based on the calculated current outlet pressure, so as to select a flow rate characteristic matching the fluid state. The power-on duration can be calculated accurately based on the selected flow rate characteristic, so as to accurately control the air-fuel ratio.

Figure 2:
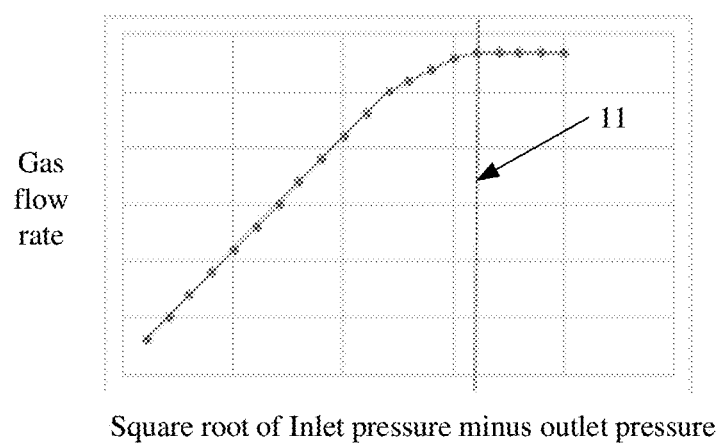
FIG. 2 shows a graph showing a gas flow rate, outlet pressure of a nozzle and inlet pressure of the nozzle according to an embodiment of the disclosure.

Reference is made to FIG. 2, which shows a graph showing a gas flow rate, outlet pressure of a nozzle and inlet pressure of the nozzle according to an embodiment of the disclosure. In FIG. 2, a horizontal axis represents a square root of a difference between the inlet pressure and the outlet pressure, a vertical axis represents the gas flow rate, and a straight line 11 perpendicular to the horizontal axis represents a dividing line between sonic jet state and subsonic jet state.

It is found from study that for certain composition of the gas and a certain structure of the nozzle, a jet state of the gas is determined by a ratio of outlet pressure of the nozzle to inlet pressure of the nozzle, such that the fluid state is determined. Each fluid state corresponds to a certain ratio of outlet pressure of the nozzle to inlet pressure of the nozzle. In a case that the ratio of outlet pressure of the nozzle to inlet pressure of the nozzle is less than a set threshold, a flow speed of the gas in the nozzle is equal to the speed of sound. In this case, the gas flow rate does not change with the outlet pressure, where the fluid state is determined to be a sonic jet state. In a case that the ratio of outlet pressure of the nozzle to inlet pressure of the nozzle is not less than the set threshold, the flow speed of the gas in the nozzle is less than the speed of sound. In this case, the gas flow rate is determined by the inlet pressure and the outlet pressure of the gas nozzle, where the fluid state is determined to be a subsonic jet state.

A flow rate characteristic represents a relationship between gas flow rate and time, which varies with the fluid state. In the sonic jet state, the gas flow rate does not change with the outlet pressure. In the subsonic jet state, operating characteristics of the nozzle is required to be calibrated based on the inlet pressure and the outlet pressure of the nozzle. The calibration may be performed by laboratory tests. A correspondence between the gas flow rate and the outlet pressure and the inlet pressure may be obtained by means of linear data fitting or otherwise. A gas flow rate associated with a given inlet pressure and a given outlet pressure may be determined based on the correspondence.

In the method according to the embodiment of the present disclosure, the fluid state of the gas is determined as follows. In a case that the ratio is less than the set threshold, the fluid state of the gas is determined to be a sonic jet state. In a case that the ratio is not less than the set threshold, the fluid state of the gas is determined to be a subsonic jet state.

The set threshold is determined by a type of the gas. For natural gas, the threshold is 0.54. In a case that the ratio of the outlet pressure to the inlet pressure is less than 0.54, the fluid state in the nozzle is determined to be the sonic jet state. Otherwise, the fluid state in the nozzle is determined to be the subsonic jet state.

It can be seen that in the method, the speed state of the gas may be determined based on the gas pressure and the air pressure, to determine the fluid state, so as to select the flow rate characteristic corresponding to the fluid state. In a case that the fluid state of the gas is the sonic jet state, the gas flow rate can be corrected based on the flow rate characteristic corresponding to the sonic jet state, to calculate accurate power-on duration, thereby accurately controlling the air-fuel ratio. In a case that the fluid state of the gas is the subsonic jet state, the gas flow rate can be corrected based on the flow rate characteristic corresponding to the subsonic jet state, to calculate accurate power-on duration, thereby accurately controlling the air-fuel ratio. Therefore, with the method according to the embodiment of the present disclosure, the air-fuel ratio can be accurately controlled both in the sonic jet state and the subsonic jet state.

In the method, the power-on duration is calculated as follows. The power-on duration is calculated based on a flow rate characteristic of the gas in the sonic jet state in a case that the gas is in the sonic jet state. The power-on duration is calculated based on a flow rate characteristic of the gas in the subsonic jet state in a case that the gas is in the subsonic jet state.

The flow rate characteristic in each of the sonic jet state and the subsonic jet state may be calibrated based on data of multiple sets of gas flow rate and time that is collected in the corresponding fluid state. For example, a flow rate characteristic curve in the corresponding fluid state may be determined by linear fitting, and the power-on duration corresponding to any gas flow rate can be calculated based on the flow rate characteristic curve. Alternatively, a database for a corresponding fluid state may be created, which includes calibration data of multiple sets of gas flow rate and time, and the power-on duration corresponding to any gas flow rate can be calculated by performing an interpolation operation on the calibration data in the database.

Figure 3:
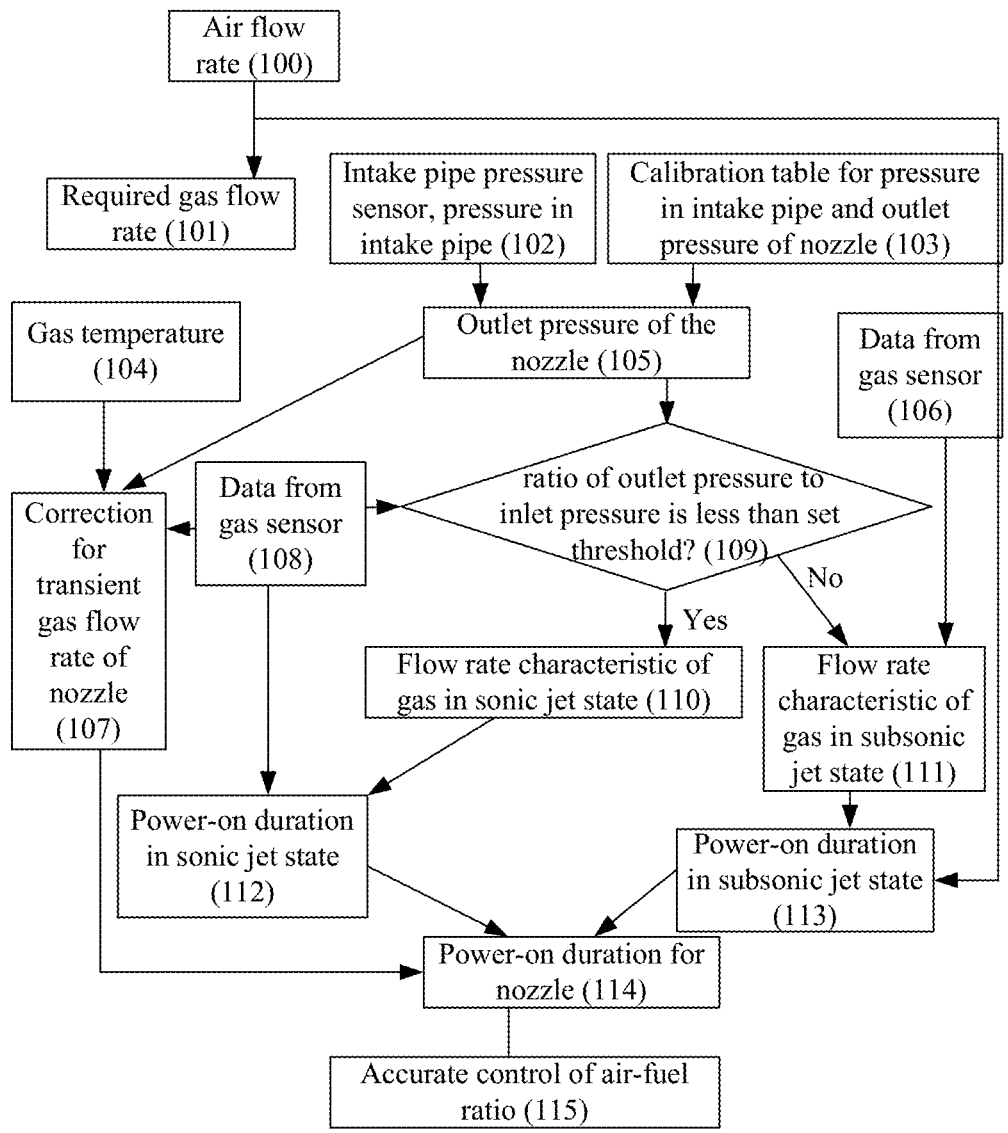
FIG. 3 is a schematic diagram showing a principle for controlling an air-fuel ratio for a gas engine according to an embodiment of the disclosure.

Reference is made to FIG. 3, which is a schematic diagram showing a principle for controlling an air-fuel ratio for a gas engine according to an embodiment of the disclosure. In order to control the air-fuel ratio, an air flow rate (100) and a required gas flow rate (101) are obtained. Pressure in an intake pipe (102) is then collected by an intake pipe pressure sensor, and reference is made to a calibration table for pressure in the intake pipe and outlet pressure of nozzle (103) to obtain an outlet pressure of the nozzle (105). Thereafter, it is determined whether a ratio of the outlet pressure of the nozzle to an inlet pressure of the nozzle is less than a set threshold (109). In a case that the ratio is less than the set threshold, it is determined that the gas is in a sonic jet state, and power-on duration of the nozzle in the sonic jet state (112) is calculated based on a flow rate characteristic of the gas in the sonic jet state (110), which is determined as power-on duration for the nozzle (114), where the flow rate characteristic of the gas in the sonic jet state may be determined based on data from a gas sensor (106). In a case that the ratio is not less than the set threshold, it is determined that the gas is in a subsonic jet state; and power-on duration of the nozzle in the subsonic jet state (113) is calculated based on a flow rate characteristic of the gas in the subsonic jet state (111) and data from the gas sensor (108), which is determined as the power-on duration for the nozzle (114). Then, accurate control of the air-fuel ratio (115) can be achieved based on the power-on duration for the nozzle (114). In addition, correction for transient gas flow rate of the nozzle (107) can be performed based a gas temperature (104) and the data from the gas sensor (108).

With the method according to the embodiment of the present disclosure, it can be determined whether the gas is in the sonic jet state or the subsonic jet state. In a case that the gas is in the sonic jet state, the gas flow rate is only associated with the inlet pressure of the nozzle. The inlet pressure may be detected by a built-in gas valve rail pressure sensor of the gas engine. In this case, the built-in gas valve rail pressure sensor of the gas engine participates in control of the gas flow rate, the power-on duration for the nozzle is calculated, and the flow rate characteristic follows sonic flow rate characteristics. In a case that the gas is in the subsonic jet state, the built-in gas valve rail pressure sensor of the gas engine and an intake pipe pressure sensor participate in control of the gas flow rate, the power-on duration for the nozzle is calculated, and the flow rate characteristic follows subsonic flow rate characteristics.

In an embodiment, the method further includes: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference. For the gas at a specific temperature, the gas flow rates at an opening time instant and a closing time instant of the nozzle are associated with the difference between the current inlet pressure of the nozzle and the current outlet pressure of the nozzle. Therefore, flow rate differences in case of various pressure differences at a given temperature may be collected to construct a correction model for correcting the power-on duration for the nozzle. With the method in case of the subsonic jet state, the air-fuel ratio can be accurately controlled in an operation condition of low gas pressure. A transient gas flow rate may be corrected based on the outlet pressure of the nozzle, a gas temperature and data from a built-in pressure sensor, to correct the gas flow rates at opening time instants and closing time instants of the nozzle, such that performance of the nozzle for accurately controlling the gas flow rate can be improved.

It can be seen from the above description that with the method according to the embodiment of the present disclosure, the current outlet pressure of the nozzle is calculated based on the current pressure in the intake pipe and the current rotational speed, without detecting the outlet pressure of the nozzle by a sensor. The fluid state of the gas is determined based on the ratio of the current outlet pressure to the current inlet pressure of the nozzle collected by a sensor, to determine whether the gas is in the sonic jet state or the subsonic jet state, such that the flow rate characteristic corresponding to the fluid state can be selected. Different built-in sensors participate in flow rate control to calculate the power-on duration for the nozzle, so as to set the air-fuel ratio based on the power-on duration.

With the technical solutions of the present disclosure, the power-on duration is calculated based on flow rate characteristics of the gas in respective fluid states, thereby achieving an air-fuel ratio with high accuracy. By calculating the power-on duration based on flow rate characteristics matching respective fluid states, accurate gas flow rates at both the opening time instants and closing time instants of the nozzle in the subsonic jet state can be obtained, such that the gas flow rates at the opening time instants and closing time instants of the nozzle in the subsonic jet state are corrected, thereby accurately controlling the air-fuel ratio under special operation conditions.

Figure 4:
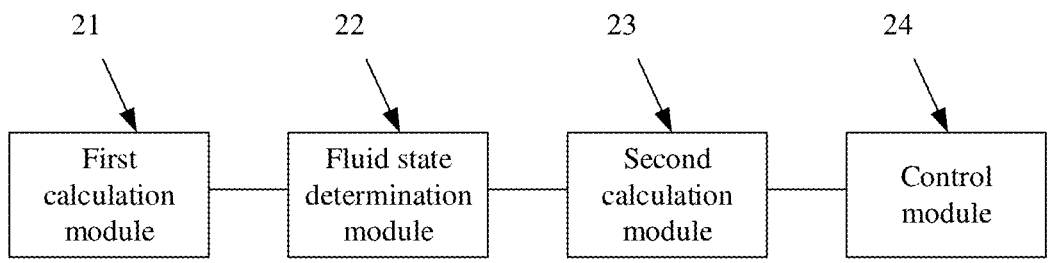
FIG. 4 is a schematic structural diagram of a system for controlling an air-fuel ratio of a gas engine according to an embodiment of the disclosure.

Based on the above embodiments, a system for controlling an air-fuel ratio for a gas engine is further provided according to an embodiment of the present disclosure. Reference is made to FIG. 4, which is a schematic structural diagram of a system for controlling an air-fuel ratio of a gas engine according to an embodiment of the disclosure. The system includes a first calculation module 21, a fluid state determination module 22, a second calculation module 23, and a control module 24.

The first calculation module 21 is configured to calculate current outlet pressure of a nozzle based on current pressure in an intake pipe and a current rotational speed.

The fluid state determination module 22 is configured to determine a fluid state of a gas based on a ratio of the current outlet pressure of the nozzle to current inlet pressure of the nozzle, where the current inlet pressure of the nozzle is collected by a sensor.

The second calculation module 23 is configured to calculate power-on duration for the nozzle based on a flow rate characteristic corresponding to the fluid state.

The control module 24 is configured to control the air-fuel ratio based on the power-on duration.

In an embodiment, the first calculation module 21 is configured to calculate the current outlet pressure at the current pressure in the intake pipe and the current rotational speed, based on a preset calibration model of pressure in the intake pipe and outlet pressure of the nozzle.

In an embodiment, the first calculation module 21 calculates the current outlet pressure by: determining, in a case that the calibration model includes both a calibration value corresponding to the current pressure in the intake pipe and a calibration value corresponding to the current rotational speed, an outlet pressure calibration value recorded in association with both the calibration value corresponding to the current pressure in the intake pipe and the calibration value corresponding to the current rotational speed as the current outlet pressure of the nozzle; and performing, in a case that the calibration model fails to include both the calibration value corresponding to the current pressure in the intake pipe and the calibration value corresponding to the current rotational speed, a weighted calculation on the current pressure in the intake pipe, the current rotational speed and selected calibration values, to obtain the current outlet pressure of the nozzle.

The system for controlling an air-fuel ratio for a gas engine according to the embodiment of the present disclosure may perform the above method for controlling an air-fuel ratio for a gas engine. The power-on duration is calculated based on flow rate characteristics of the gas in respective fluid states, thereby achieving an air-fuel ratio with high accuracy. By calculating the power-on duration based on flow rate characteristics matching respective fluid states, accurate gas flow rates at both the opening time instants and closing time instants of the nozzle in the subsonic jet state can be obtained, such that the gas flow rates at the opening time instants and closing time instants of the nozzle in the subsonic jet state are corrected, thereby accurately controlling the air-fuel ratio under special operation conditions.

It is noted that the above method and system for controlling an air-fuel ratio for a gas engine can be implemented by a computer. The computer includes a processor and a memory. The memory stores instructions that, when executed by a processor, cause the processor to perform the method according to any of the above embodiments.

The memory contains a program command, a data file, a data structure, or a combination thereof. A program recorded in the memory may be designed or configured to implement the method according to the present disclosure. The memory includes a hardware system configured to store and execute program instructions. Examples of the hardware system are a magnetic medium (such as a hard disk, a floppy disk and a magnetic tape), an optical medium (such as a CD-ROM and a DVD), a magneto-optical media (such as a floptical disk, a ROM, a RAM and a flash memory). The program includes assembly language codes or machine codes compiled by a compiler and advanced language codes interpreted by an interpreter. The hardware system can utilize at least one software module to implement in accordance with the present disclosure.

The embodiments in this specification are described in progressive, in parallel, or in a combination of progressive and parallel, each of which emphasizes the differences from others, and the same or similar parts among the embodiments can be referred to each other. Since the system disclosed in the embodiments corresponds to the method therein, the description of the system is relatively simple, and relevant parts may be referred to the description of the corresponding part of the method.

It should be further noted that the relationship terminologies such as first, second or the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, an article or device including a series of elements includes not only the elements but also other elements that are not enumerated, or also includes the elements inherent for the article or device. Unless expressively limited otherwise, the statement "comprising (including) one . . . " does not exclude the case that other similar elements may exist in the article or device.

Based on the above description of the disclosed embodiments, those skilled in the art can implement or use the present disclosure. It is apparent that those skilled in the art can make various modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

What is claimed is:

1. A method for controlling an air-fuel ratio for a gas engine, comprising:
    calculating, based on current pressure in an intake pipe and a current rotational speed, current outlet pressure of a nozzle;
    determining, based on a ratio of the current outlet pressure of the nozzle to current inlet pressure of the nozzle, a fluid state of a gas, wherein the current inlet pressure of the nozzle is collected by a sensor;
    calculating, based on a flow rate characteristic corresponding to the fluid state, power-on duration for the nozzle; and
    controlling the air-fuel ratio based on the power-on duration.

2. The method according to claim 1, wherein calculating the current outlet pressure comprises:
    calculating the current outlet pressure, based on a preset calibration model of pressure in the intake pipe and outlet pressure of the nozzle, wherein the current outlet pressure corresponds to the current pressure in the intake pipe and the current rotational speed.

3. The method according to claim 2, wherein the preset calibration model comprises a data table recording calibration values, and calculating the current outlet pressure comprises:
    determining, in a case that the preset calibration model includes both a first calibration value corresponding to the current pressure in the intake pipe and a second calibration value corresponding to the current rotational speed, an outlet pressure calibration value recorded in association with both the first calibration value and the second calibration value as the current outlet pressure of the nozzle; and
    performing, in a case that the preset calibration model fails to include both the first calibration value and the second calibration value, a weighted calculation on the current pressure in the intake pipe, the current rotational speed and selected calibration values, to obtain the current outlet pressure of the nozzle.

4. The method according to claim 2, further comprising: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

5. The method according to claim 3, wherein the current outlet pressure is calculated from the following equation:

$$Y = \frac{X - X_1}{X_2 - X_1} * \left[ \frac{V - V_1}{V_2 - V_1} * Y_{11} + \frac{V_2 - V}{V_2 - V_1} * Y_{12} \right] + \frac{X_2 - X}{X_2 - X_1} * \left[ \frac{V - V_1}{V_2 - V_1} * Y_{21} + \frac{V_2 - V}{V_2 - V_1} * Y_{22} \right]$$

wherein Y represents the current outlet pressure, V represents the current rotational speed, X represents the current pressure in the intake pipe, $V_1$ and $V_2$ represent two calibration values of rotational speeds sandwiching V, $X_1$ and $X_2$ represent two calibration values of pressure in the intake pipe sandwiching X, $Y_{ij}$ represents an outlet pressure calibration value corresponding to $V_i$ and $X_j$, i is 1 or 2, and j is 1 or 2.

6. The method according to claim 3, further comprising: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

7. The method according to claim 5, further comprising: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

8. The method according to claim 1, wherein determining the fluid state of the gas comprises:
determining the fluid state of the gas to be a sonic jet state in a case that the ratio is less than a set threshold; and
determining the fluid state of the gas to be a subsonic jet state in a case that the ratio is equal to or greater than the set threshold.

9. The method according to claim 8, wherein calculating the power-on duration comprises:
calculating the power-on duration based on a flow rate characteristic of the gas in the sonic jet state in a case that the gas is in the sonic jet state; and
calculating the power-on duration based on a flow rate characteristic of the gas in the subsonic jet state in a case that the gas is in the subsonic jet state.

10. The method according to claim 8, further comprising: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

11. The method according to claim 9, further comprising: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

12. The method according to claim 1, further comprising: correcting a gas flow rate difference between flow rates of the gas at an opening time instant and a closing time instant of the nozzle, based on a power-on voltage for the nozzle and a difference between the current inlet pressure of the nozzle and the current outlet pressure of the nozzle, and correcting the power-on duration for the nozzle based on the gas flow rate difference.

13. A system for controlling an air-fuel ratio for a gas engine, comprising:
a first calculation module configured to calculate, based on current pressure in an intake pipe and a current rotational speed, current outlet pressure of a nozzle;
a fluid state determination module configured to determine, based on a ratio of the current outlet pressure of the nozzle to current inlet pressure of the nozzle, a fluid state of a gas, wherein the current inlet pressure of the nozzle is collected by a sensor;
a second calculation module configured to calculate, based on a flow rate characteristic corresponding to the fluid state, power-on duration for the nozzle; and
a control module configured to control the air-fuel ratio based on the power-on duration.

14. The system according to claim 13, wherein the first calculation module is configured to calculate the current outlet pressure based on a preset calibration model of pressure in the intake pipe and outlet pressure of the nozzle, wherein the current outlet pressure corresponds to the current pressure in the intake pipe and the current rotational speed.

15. The control system according to claim 14, wherein the preset calibration model comprises a data table recording calibration values, and the first calculation module calculates the current outlet pressure of the nozzle by:
determining, in a case that the preset calibration model includes both a first calibration value corresponding to the current pressure in the intake pipe and a second calibration value corresponding to the current rotational speed, an outlet pressure calibration value recorded in association with both the first calibration value and the second calibration value as the current outlet pressure of the nozzle; and
performing, in a case that the preset calibration model fails to include both the first calibration value and the second calibration value, a weighted calculation on the current pressure in the intake pipe, the current rotational speed and selected calibration values, to obtain the current outlet pressure of the nozzle.

* * * * *